United States Patent [19]

Bunn et al.

[11] Patent Number: 5,071,016

[45] Date of Patent: Dec. 10, 1991

[54] COFFEE DECANTER

[75] Inventors: Arthur H. Bunn, Springfield; Frank J. Lang, Lemont, both of Ill.

[73] Assignee: Bunn-O-Matic Corporation, Springfield, Ill.

[21] Appl. No.: 422,152

[22] Filed: Oct. 16, 1989

Related U.S. Application Data

[62] Division of Ser. No. 245,779, Sep. 16, 1988, abandoned.

[51] Int. Cl.⁵ .................. B65D 25/28; B65D 25/40
[52] U.S. Cl. .................. 215/100 A; 222/566
[58] Field of Search .................. 215/100 A, 100.5; 220/85 SP, 90.4, 90.6; 222/566, 572, 575

[56] References Cited

U.S. PATENT DOCUMENTS

| 747,249 | 12/1903 | Smith | 222/572 |
|---|---|---|---|
| 1,028,339 | 6/1912 | Eubank | 222/572 X |
| 1,718,897 | 5/1929 | Dunbar et al. | 222/572 X |
| 1,820,406 | 8/1931 | Thompson | 220/85.5 P |
| 2,239,065 | 4/1941 | Wainwright | 222/566 X |
| 2,807,944 | 10/1957 | Glass | 220/90.6 X |
| 2,858,041 | 10/1958 | Robinson | 220/90.4 |
| 3,105,714 | 10/1963 | Kimber, Jr. | 215/100 A X |
| 3,710,709 | 1/1973 | Roncarelli | 222/572 X |
| 3,797,696 | 3/1974 | Dibrell | 220/90.4 |
| 4,235,348 | 11/1980 | Watson | 220/90.4 |

FOREIGN PATENT DOCUMENTS

| 24566 | 7/1972 | Australia | 222/572 |
|---|---|---|---|
| 2217453 | 2/1973 | Fed. Rep. of Germany | 222/572 |
| 803645 | 10/1936 | France . | |
| 967426 | 11/1950 | France | 220/572 |
| 173128 | 12/1921 | United Kingdom | 222/572 |
| 729252 | 5/1955 | United Kingdom | 222/566 |
| 2091677 | 8/1982 | United Kingdom | 220/90.4 |

Primary Examiner—Sue A. Weaver
Attorney, Agent, or Firm—Trexler, Bushnell, Giangiorgi & Blackstone, Ltd.

[57] ABSTRACT

A decanter or carafe for serving hot coffee having a metal bottom to which a plastic upper portion is joined. The decanter is unbreakable and shatterproof for all practical purposes. The lip of the pouring spout is shaped to facilitate pouring to either side as well as frontwards. A pistol grip handle skeleton is integrally joined to the plastic upper portion and receives mating grip pieces from opposite sides. The mating grip pieces may be colored brown to designate "regular" coffee and orange to designate "de-caffinated" coffee. The composite handle incorporates vents to drain liquid that might otherwise become trapped therein.

3 Claims, 4 Drawing Sheets

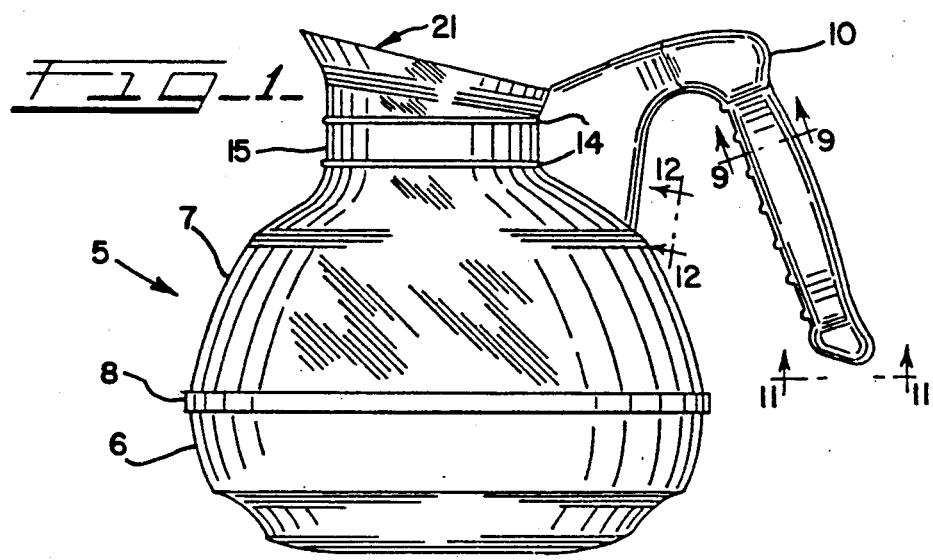
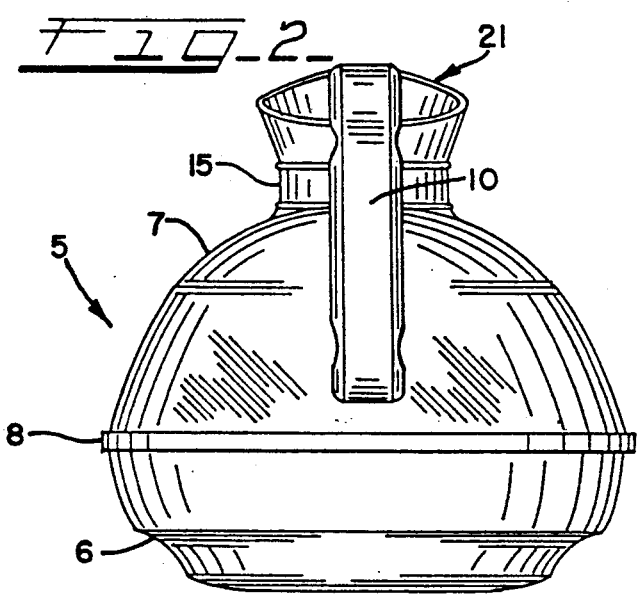
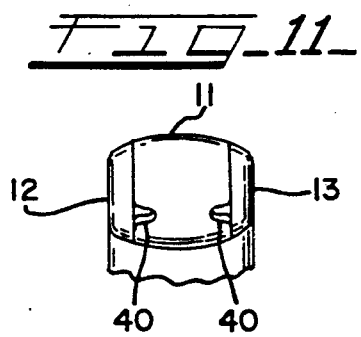
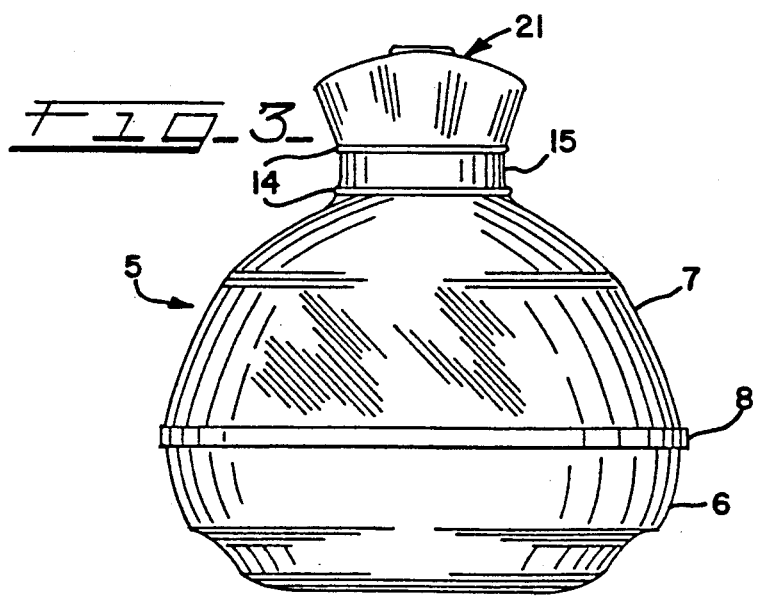
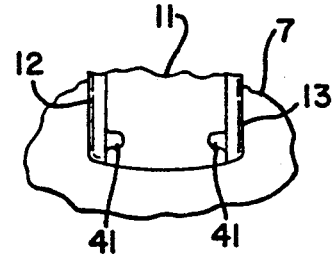

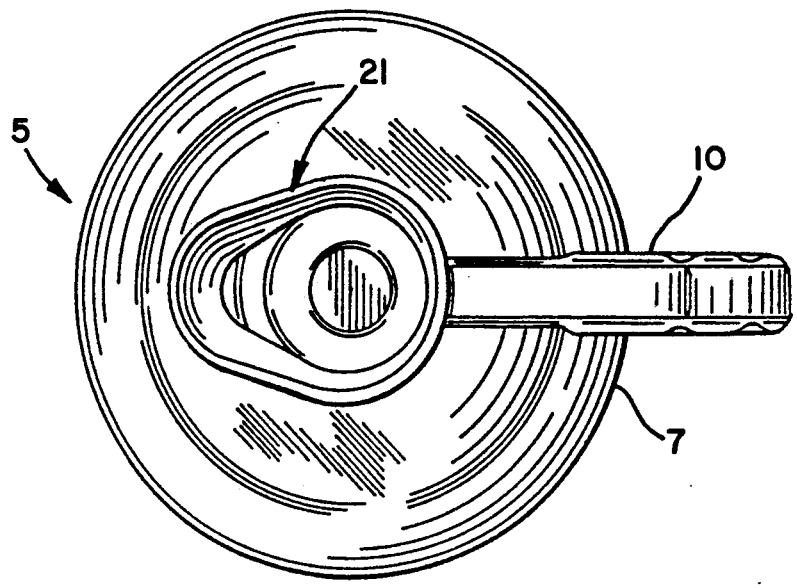
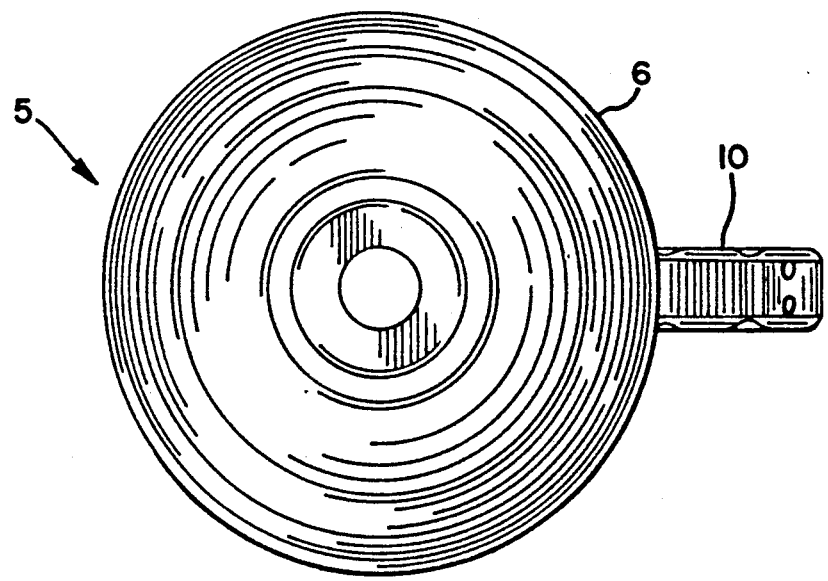

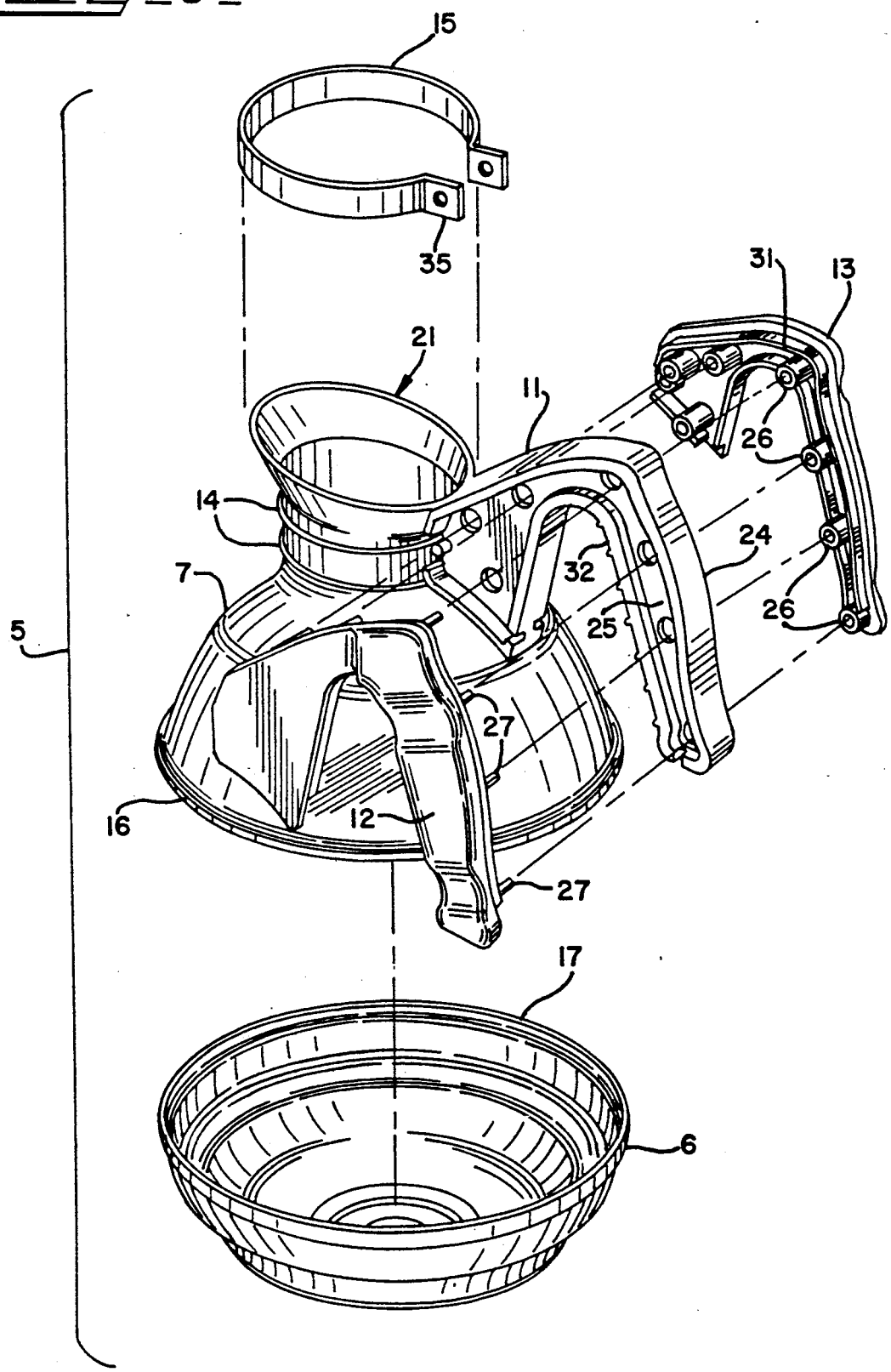
FIG_6

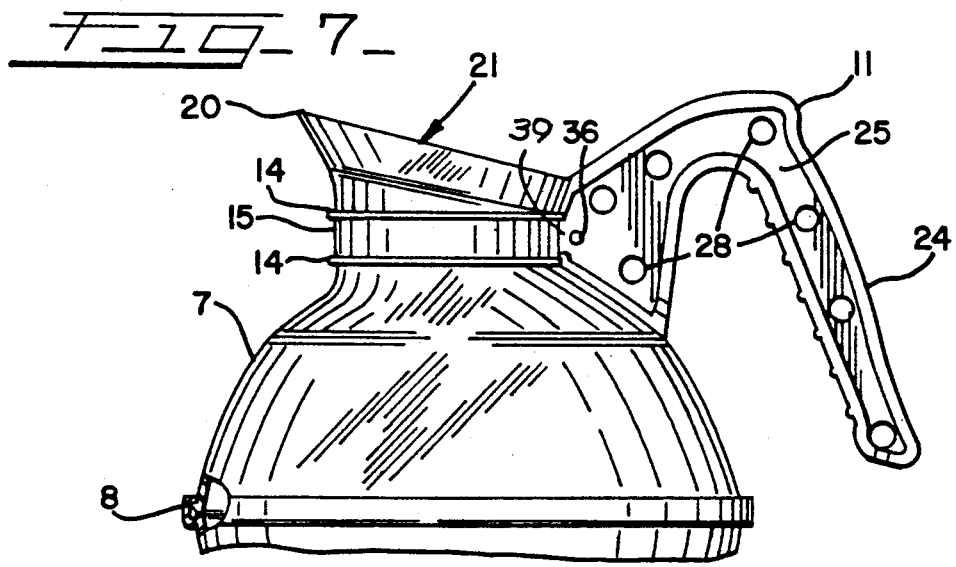
FIG. 7
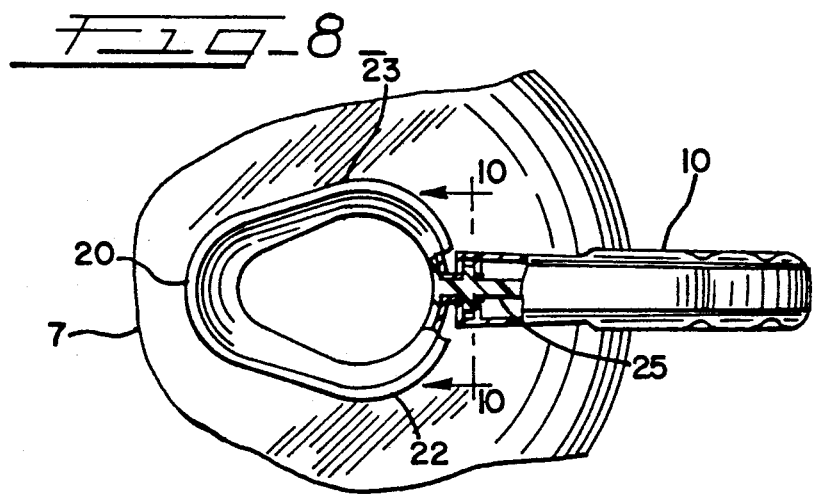
FIG. 8
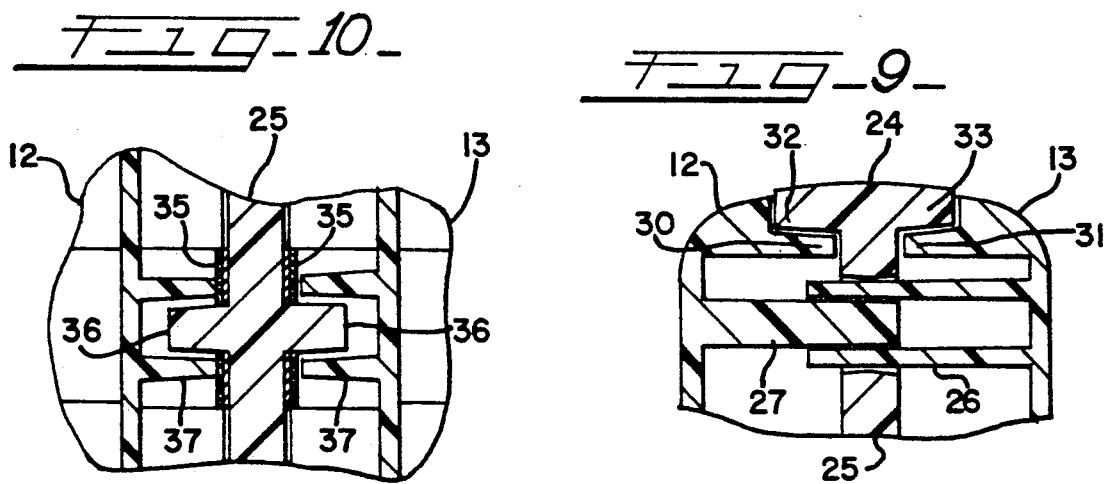
FIG. 10
FIG. 9

COFFEE DECANTER

This is a divisional of copending application(s) Ser. No. 07/245,779 filed on Sept. 16, 1988, now abandoned.

This invention relates generally to innovations in decanters or carafes for serving hot coffee, tea, water and other beverages. The invention relates in particular to the configuration of the mouth of the decanters so as to facilitate pouring in three different directions and to the structure of the pistol-grip handle the structural skeleton of which is integrally connected to the body of the decanter. Further, the invention relates particularly to hot beverage decanters having a plastic is joined in a leakproof seam or joint.

Decanters or carafes for serving hot coffee, tea, water and other hot beverages are well known. In the past, many such commercial decanters were formed of glass with handles attached by various mechanical arrangements. Such decanters formed with metal bottoms and transparent upper portions have been known and disclosed, for example in U.S. Pat. No. 3,145,708 dated Aug. 25, 1964 and Design Patent No. 259,613 dated June 23, 1981.

The object of the present invention, generally stated, is the provision of decanters for serving hot beverages, particularly hot coffee which incorporate innovations in the configuration or formation of the mouths so as to facilitate pouring by tilting forwardly or to the left or to the right, and to integrally attached skeletal handles to which differently colored handle-completing members may be attached to form composite serving handles.

An important object of the invention is the provision of decanters for serving hot beverages, particularly hot coffee, wherein at least the upper body portions are formed of plastic to which a pistol-grip skeletal handle is integrally attached and onto the opposite sides of which handle or grip completing members are fastened with the resultant composite handle having openings at the top and bottom for drainage of any liquid that may seep into the handle.

A further object of the invention is the provision of a decanter for serving hot liquids such as coffee having a skeletal handle integrally attached to the body of the decanter with side members attached or secured to opposite sides of the skeletal handle so as to complete its formation with one of the members having a plurality of cylindrical sockets that project through the skeletal handle from one side and the other member having a plurality of pins which project into the sockets and through the skeletal handle from the opposite side with the socket-pin combinations serving as rigidifying members in the composite handle structure.

Certain other objects of the invention will appear from the following detailed description of the preferred embodiment of the invention taken in connection with the accompanying drawings wherein:

FIG. 1 is a side elevational view of a decanter embodying the present invention;

FIG. 2 is a rear elevational view of the decanter shown in FIG. 1;

FIG. 3 is a front elevational view of the decanter shown in FIG. 1;

FIG. 4 is a top plan view of the decanter shown in FIG. 1;

FIG. 5 is a bottom plan view of the decanter shown in FIG. 1;

FIG. 6 is an exploded perspective view showing the components of the decanter shown in FIGS. 1-5;

FIG. 7 is a fragmentary side elevational view of the decanter shown in FIG. 1 with a portion of the body broken away at the joint between the bottom and upper portions of the decanter body and with the integral skeletal handle shown in its bare condition;

FIG. 8 is a fragmentary top plan view with a portion of the composite handle structure broken away;

FIG. 9 is a fragmentary sectional view on enlarged scale taken on line 9—9 of FIG. 1;

FIG. 10 is a fragmentary sectional view on enlarged scale taken on line 10—10 of FIG. 8;

FIG. 11 is an enlarged view taken on line 11—11 of FIG. 1; and

FIG. 12 is an enlarged fragmentary view taken on line 12—12 of FIG. 1.

Referring to FIGS. 1—6, there is indicated therein generally at 5 a decanter for serving hot beverages, particularly coffee. The decanter 5 has a metal bottom portion 6 joined to a plastic upper portion 7 at a circumferential joint or seam 8.

The decanter 5 has a pistol-grip type handle indicated generally at 10 which (referring to FIG. 6) is formed by a skeletal handle 11 integrally molded on the upper plastic portion 7 and left and right hand side members 12 and 13. Preferably, the neck of the plastic upper portion 7 has two spaced circumferential beads 14—14 between which is secured a decorative band 15.

The bottom portion 6 may be formed in known manner from metal, with aluminum or stainless steel being the metals of choice The upper transparent portion 7 is preferably formed by injection molding in known manner from a suitable heat resistant and durable material such as polysulfone. The bottom of the skirt of the plastic upper portion 7 is formed with a circumferential bead 16 and the rim of the bottom portion 6 is formed with a circumferential vertical collar 17 into which the bead 16 sets. The collar 17 and bead 16 are mechanically worked into a leakproof joint 8 as shown in FIG. 7. The manner of joining the metal bottom portion 6 and plastic upper portion 7 together is known in the art and does not form a part of the present invention.

In use, the decanter 5 will be carried by one hand of the server grasping the handle 10. Generally, the server will tilt the decanter 5 forwardly so that beverage is poured out in a stream at the front portion 20 of the decanter mouth indicated generally at 21. In plan view, the mouth 21 is generally pear-shaped with the front pouring area or weir 20 being at the small end of the pear-shape and with the handle 10 attached at the base or opposite end of the pear-shape The bulges on opposite sides of the front-to-rear center line of the mouth 21 are shaped so as to provide two sides weirs or left and right pouring areas 22 and 23 (FIG. 8). In serving, often there are instances when it is more convenient for the server to pour coffee or other contents from the decanter by tilting to one side rather than by tilting it forwardly. The pouring areas 22 and 23 concentrate the outpouring streams into narrow streams so as to facilitate the pouring of the contents into coffee cups.

A secure and rigid handle 10 constitutes an important component of a decanter for serving hot beverages such as coffee. By having the skeletal handle 11 integrally molded as part of the upper portion 7 and joined to the rear of the decanter neck and also to the shoulder portion of the upper portion 7, a very secure and rigid handle 10 is provided.

The skeletal handle 11 is formed and outlined by an integral band portion 24 which surrounds and is integrally connected to a central web portion 25. The band portion 24 is relatively wide and provides for a substantial area of integral connection of the skeletal handle 11 and upper shoulder portion of the upper portion 7.

As will be apparent from FIG. 6, the handle completing members 12 and 13 fit onto and within the band portion 24 from opposite sides of the web portion 25. The member 13 is provided with a plurality of integrally formed pin-like sockets 26—26 while the member 12 is provided with a plurality of integrally formed pins 27—27. In assembly, the cylindrical sockets 26 project through holes 28—28 provided therefore in the skeletal handle 11 and the pins 27 project snugly into the cylindrical sockets 26. This form of interconnection is shown in FIG. 9 and the interfitting and interlocking sockets 26 and pins 27 provide enhanced rigidity to the structure of the handle 10.

Each of the handle members 12 and 13 is provided with a rectangular shoulder 30 and 31, respectively (FIG. 9) which interfits with the adjoining edges 32 and 33, respectively, of the skeletal handle 11. This interfitting arrangement adds further to the rigidity of the handle 10.

It is a current practice to color-code decanters for hot coffee using the color brown to designate "regular" coffee and the color orange to designate "de-caffinated" coffee. While the upper portion 7 of the decanter 5 will generally be formed of clear plastic so as to be color neutral, the handle side members or inserts 12 and 13 can be readily formed in the colors brown or orange, or any other desired color.

The band 15 is provided for decorative or esthetic value and desirably will be formed of metal such as chrome-finished steel and will have two ears 35—35 (FIGS. 6 and 10) for attachment to the web portion 25 of the skeletal handle 11. To provide this connection, the web portion 25 is provided with two integrally formed pins 36—36 (FIGS. 6, 7 and 10) projecting from opposite sides and over which the apertured ears 35 of the band 15 fit. The ears 35 are held in place over the pins 36 by means of sockets 37—37 integrally formed on the interfaces of the handle side members 12 and 13.

The side members 12 and 13 may be either detachably or permanently assembled to the skeletal handle 11. With the pins 27 having a snug or friction fit in the sockets 26, the side members upon being pressed together will remain assembled to the skeletal handle 11 and yet they may be pried off in the event replacement is desired such as to provide a handle 10 in a different color.

When the side members 12 and 13 are formed of a solvent-softenable plastic, the pins 27 and/or 26 may be dipped in a suitable solvent so as to slightly soften these elements. Then after the side members 12 and 13 are assembled to the skeletal handle 11 a permanent bond will form between the pins and sockets preventing disassembly of the composite handle structure.

Since small amounts of liquid (e.g. dish water) may seep into the composite handle 11, provision is made for the escape or venting of such trapped liquids. When the decanter 5 is setting in its normal upright position as shown in FIG. 1, and/or vent notches 41—41 (FIG. 12). The notches 40 and 41 are formed in the band portion 24 of the skeletal handle 11 and the open sides thereof are closed by adjacent surfaces of the handle members, 12 and 13 so as to leave drain holes communicating with the interior of the composite handle 10.

What is claimed is:

1. A decanter for serving beverages comprising at least an upper body portion integrally formed as a single piece body, a handle attached to said body for carrying and operating said decanter with a single hand; said upper body portion having a mouth formed through a neck portion generally integrally formed on a top area of said upper body portion, said mouth providing passage through which beverages, disposed within said decanter, are dispensed when said decanter is inclined for pouring; said mouth formed through said neck portion having a generally pear-shaped rim with three pouring areas integrally formed and positioned for pouring beverages from said decanter, a front pouring area of said three pouring areas formed in said mouth in a first arc opposite said handle for front pouring, two side pouring areas of said three pouring areas formed on a second arc opposing said first arc along said mouth for side pouring, said second arc having a greater diameter than said first arc and said first and second arcs being connected by generally straight sides.

2. A decanter for serving beverages as in claim 1 wherein said side pouring areas generally are spaced along said mouth perpendicular to said front pouring area and opposite one another on said mouth, said side pouring areas permitting pouring of beverages disposed within said decanter out of said decanter from either side generally perpendicular to said front pouring area when said decanter is correspondingly inclined for pouring.

3. A decanter for serving beverages comprising at least an upper body portion integrally formed as a single piece body, a handle attached to said body for carrying and operating said decanter with a single hand, said upper body portion having a mouth formed through a neck portion integrally formed on a top area of said upper body portion, said mouth providing passage for beverages to flow therethrough when said decanter is inclined for pouring, said mouth formed through said neck portion having a generally pear-shaped rim with at least three pouring areas integrally formed and positioned for pouring beverages from said decanter, a front pouring area of said three pouring areas formed in said mouth in a first arc opposite said handle for front pouring, two side pouring areas of said three pouring areas formed on a second arc opposite said first arc along said mouth for side pouring, said handle integrally attached to said pear-shaped rim on said second arc between said two side pouring areas, said second arc having a greater diameter than said first arc and said first and second arcs being connected by generally straight lines.

* * * * *